(12) United States Patent
Ren et al.

(10) Patent No.: US 10,051,051 B2
(45) Date of Patent: Aug. 14, 2018

(54) ONLINE COMMUNITY BASED PEER-TO-PEER MEDIA STREAMING SYSTEMS AND METHODS

(75) Inventors: Dahai Ren, Lincoln, MA (US); Ming Chen, Bedford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1039 days.

(21) Appl. No.: 13/538,973

(22) Filed: Jun. 29, 2012

(65) Prior Publication Data

US 2014/0006499 A1 Jan. 2, 2014

(51) Int. Cl.
| | |
|---|---|
| G06Q 10/10 | (2012.01) |
| H04L 29/08 | (2006.01) |
| H04L 29/06 | (2006.01) |
| H04N 21/63 | (2011.01) |

(52) U.S. Cl.
CPC ........ *H04L 67/1082* (2013.01); *H04L 65/403* (2013.01); *H04L 65/4076* (2013.01); *H04L 65/4084* (2013.01); *H04L 67/1091* (2013.01); *H04N 21/632* (2013.01)

(58) Field of Classification Search
CPC ................................. G06Q 10/10; H04L 29/06
USPC ......................................................... 709/204
See application file for complete search history.

(56) References Cited

U.S. PATENT DOCUMENTS

| | | | | |
|---|---|---|---|---|
| 8,751,582 B1 * | 6/2014 | Behforooz | ............ | H04L 51/043 709/206 |
| 9,009,082 B1 * | 4/2015 | Marshall | ............ | G06Q 30/0601 705/26.1 |
| 2003/0217171 A1 * | 11/2003 | Von Stuermer | ...... | G11B 27/036 709/231 |
| 2007/0021137 A1 * | 1/2007 | Kokkonen | ............ | H04L 41/042 455/518 |
| 2008/0281971 A1 * | 11/2008 | Leppanen | ........... | H04L 12/1818 709/228 |
| 2009/0024754 A1 * | 1/2009 | Setton | ................. | H04L 65/4084 709/231 |
| 2009/0260060 A1 * | 10/2009 | Smith | ................... | H04L 63/105 726/3 |
| 2011/0153835 A1 * | 6/2011 | Rimac | ................... | H04L 67/104 709/227 |
| 2011/0243553 A1 * | 10/2011 | Russell | ............. | G06Q 30/0631 398/25 |
| 2012/0054278 A1 * | 3/2012 | Taleb | ..................... | G06Q 50/01 709/204 |
| 2012/0209954 A1 * | 8/2012 | Wright | ............... | H04L 43/0817 709/217 |
| 2013/0013698 A1 * | 1/2013 | Relyea et al. | ................ | 709/206 |
| 2013/0103814 A1 * | 4/2013 | Carrasco | ................ | H04L 65/00 709/223 |

* cited by examiner

*Primary Examiner* — Vivek Srivastava
*Assistant Examiner* — Hien Doan

(57) ABSTRACT

Online community based peer-to-peer media streaming systems and methods are disclosed. An exemplary method includes a service providing system accessing data associated with a hosted online community comprising a plurality of members, providing a peer-to-peer media streaming event to a group of the members of the online community based on the data associated with the online community, and providing an incentive to the group of the members for participation in the peer-to-peer media streaming event. Corresponding systems and methods are also disclosed.

26 Claims, 9 Drawing Sheets

ONLINE COMMUNITY BASED PEER-TO-PEER MEDIA STREAMING SYSTEMS AND METHODS

BACKGROUND INFORMATION

Bandwidth intensive network services such as on-demand video streaming services have become commonplace in modern society. The proliferation of such services has increased the demand for 1) resources of networks over which the services are delivered and 2) tools that provide users with quality experiences with the services. Consequently, operators of such networks and/or providers of the services are interested in new technologies that would help conserve the resources of the networks and/or provide quality user experiences with the services.

To illustrate, an on-demand video streaming server (e.g., a video streaming server within a content data network) may not have sufficient resources to consistently provide quality experiences to end users of a video streaming service. For instance, the server may not be able to deliver quality video streaming experiences when a large number of concurrent live streaming requests are received by the server from end users of the video streaming service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
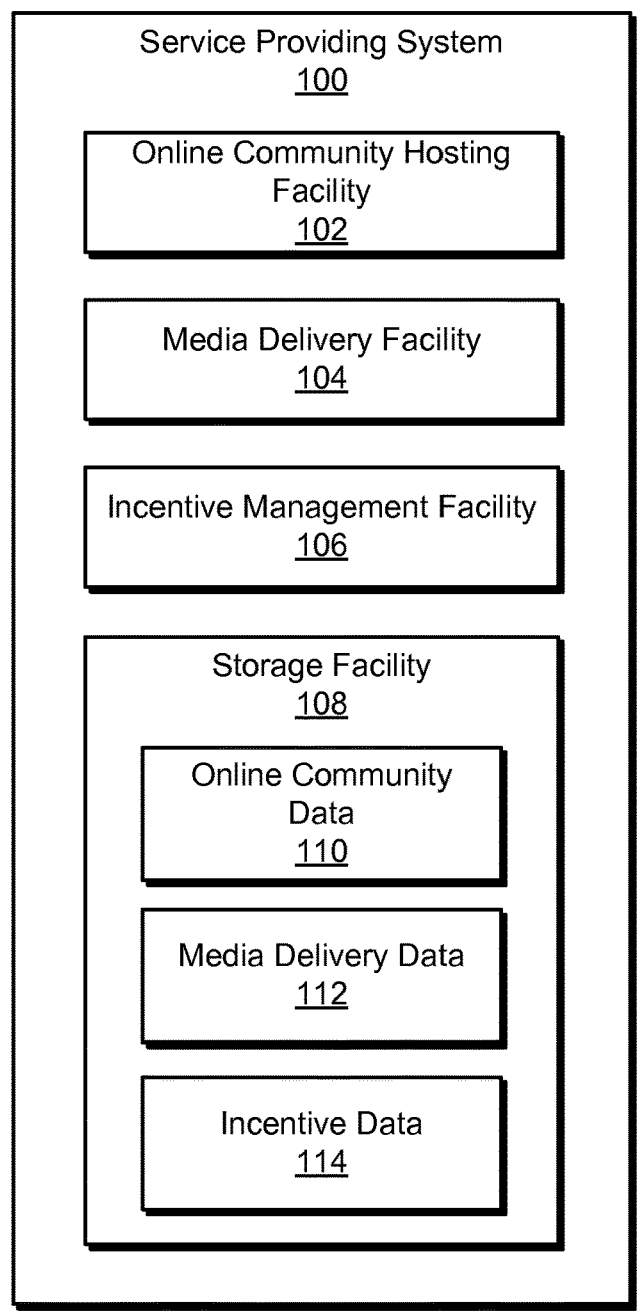
FIG. 1 illustrates an exemplary service providing system according to principles described herein.

Exemplary systems and methods for providing one or more services to end users are disclosed herein. In certain examples, the systems and methods described herein may provide a service by hosting an online community of members. For example, the systems and methods may host an online community such as an online community of members built around a hosted online forum configured to facilitate sharing of information about media content between members of the community (e.g., member reviews, recommendations, and/or ratings of movies). Examples of hosting such an online community are described herein.

In certain examples, the systems and methods described herein may use data associated with a hosted online community to provide one or more services to end users. For example, the systems and methods may use online community data to provide a peer-to-peer media streaming event to a group of members of the online community. The providing of the peer-to-peer media streaming event may include performing one or more operations to facilitate access to streamed media content by the group of members of the online community. Examples of providing a peer-to-peer media streaming event are described herein.

By using data associated with an online community (e.g., member data descriptive of members of the community) to provide a peer-to-peer media streaming event, the systems and methods described herein may leverage one or more attributes of the online community, such as one or more relationships between community members, trust between community members, statuses of community members within the online community, computing resources of community members, and/or any other assets of and/or information about community members, to provide the peer-to-peer media streaming event to the group of members. The use of data associated with the online community to provide the peer-to-peer media streaming event to the group of community members may facilitate streamed delivery of media content to the group of community members in a manner that leverages community data to provide a quality experience to the group of community members and/or that conserves computing resources and/or network resources.

In certain examples, the systems and methods described herein may provide incentives to members of an online community based on participation in the online community and/or in a peer-to-peer media streaming event that is provided to members of the online community. For example, the systems and methods may provide discounted access to media content based on participation in a peer-to-peer media streaming event. Accordingly, members of an online community may be able to gain discounted access to media content and/or to receive other incentives for participation in a peer-to-peer media streaming event and/or in the online community.

Members of the online community may be willing to participate in a peer-to-peer media streaming event because a level of trust has been built between members of the online community and/or because incentives are provided for participation in the peer-to-peer media streaming event. This may increase participation in peer-to-peer media streaming events, which may help to increase the scale of quality user experiences and/or conservation of computing and network resources.

These and/or other benefits provided by the disclosed exemplary systems and methods will be made apparent herein. Exemplary systems and methods will now be described in reference to the accompanying drawings.

FIG. 1 illustrates an exemplary service providing system 100 ("system 100"). The elements of system 100 shown in FIG. 1 may include and/or be implemented by one or more computing devices. An exemplary implementation of system 100 and exemplary computing devices are described herein.

It will be recognized that although certain elements of system 100 are shown to be separate elements in FIG. 1, any of the elements may be combined into fewer elements, such as into a single element, or divided into more elements as may serve a particular implementation. Additionally or alternatively, in alternative embodiments, any of the elements of system 100 shown in FIG. 1 may be omitted from system 100, or one or more additional elements may be added to system 100.

As shown in FIG. 1, system 100 may include, without limitation, an online community hosting facility 102 ("host facility 102"), a media delivery facility 104, an incentive management facility 106, and a storage facility 108 selectively and communicatively coupled to one another. The facilities may be communicatively coupled one to another by way of any suitable communication technologies.

Storage facility 108 may be configured to maintain online community data 110 generated and/or used by host facility 102, media delivery data 112 generated and/or used by media delivery facility 104, and incentive data 114 generated and/or used by incentive management facility 106. Examples of online community data 110, media delivery data 112, and incentive data 114 are described herein. Storage facility 108 may maintain additional or alternative data as may serve a particular implementation.

Host facility 102 may be configured to host an online community that includes a plurality of members. The online community may include any hosted virtual community that allows its members to share information between them. For example, the virtual community may be built around information exchange between members by way of hosted information sharing medium, such as a virtual bulletin board (e.g., an online message board), a chat room, an online message forum, a virtual world, a social networking service, another hosted medium for virtual sharing of information, or any combination or sub-combination thereof.

Host facility 102 may be configured to host an online community by hosting any such mediums of information exchange. In certain examples, host facility 102 may host an online community by hosting an online message forum configured to facilitate sharing of information about media content between members of the community. For instance, members may post content such as member reviews, recommendations, and/or ratings of media content (e.g., movies) to the hosted message forum for shared access by members of the community.

Host facility 102 may generate and manage online community data 110, which may include any data associated with an online community hosted by host facility 102, such as data descriptive of one or more attributes of the online community. For example, online community data 110 may include member data descriptive of members of the online community and content data representative of information shared between members (e.g., postings to a message board).

The member data may indicate any information associated with members of the online community. In certain examples, the member data may represent statuses of members within the online community. For example, host facility 102 may be configured to designate members of the online community as having any of one or more predefined member statuses. For instance, certain members may be categorized as "leaders," "followers," "active contributors," "passive viewers," "senior members," "junior members," and/or as having any other predefined statuses within the community. Host facility 102 may be configured to assign statuses to members based on contributions of the members (e.g., contribution levels of the members) to the online community.

In certain examples, the member data may represent relationships between members within the online community. For example, the member data may represent "leader-follower" relationships between certain members of the online community. For instance, a member may be designated as a leader having one or more designated followers within the online community (e.g., in response to the followers indicating that they want to follow the leader). The relationship between the leader member and each of his or her followers may be a "leader-follower" relationship. A leader-follower relationship between two members of the online community may mean that actions by the leader member within the online community may be automatically shared by host facility 102 with the member who follows the leader member. For example, information posted by the leader member may be automatically pushed by host facility 102 to the member who follows the leader member (e.g., movie recommendations posted by the leader member may be automatically pushed to the member and/or any other members who follow the leader member).

In certain examples, the member data may represent computing resources associated with members of the online community. For example, the member data may indicate computing resources of user devices associated with the members. Examples of such computing resources may include, without limitation, processor resources of the user devices, media encoding and/or decoding resources of the user devices, data buffering resources of the user devices, bandwidth resources available for communications with the user devices (e.g., network bandwidth local to the user devices such as broadband connection speeds of the user devices), memory resources of the user devices, and/or any other computing resources of the user devices.

As mentioned, in certain examples, host facility 102 may host an online community of members built around an online message forum configured to facilitate sharing of information about media content between members of the community, such as member reviews, recommendations, and/or ratings of movies, for example. In such examples, host facility 102 may be configured to facilitate members generating and submitting information about movies (e.g., members recommending movies to one another), members following or being followed by other members, and/or members inviting acquaintances to join the online community and/or to follow members of the online community.

Host facility 102 may grant membership in the online community in any suitable way and/or based on any suitable membership criteria. In certain examples, a person may register with host facility 102 as a member of the online community, and host facility 102 may maintain member data for the registered member of the online community.

In certain examples, host facility 102 may manage (e.g., define, store, share, use, or otherwise manage), as part of the member data included in online community data 110, user profiles for members of the online community. For example, host facility 102 may define a user profile for a member based on information provided to the online community by the member (e.g., user information and/or settings provided by the member), contributions by the member to the online community (e.g., the number of movie reviews, recommendations, and/or ratings provided by the member), a movie consumption history of the member (e.g., a history indicating movies accessed by the member), and/or other information about the member. Host facility 102 may allow a member to indicate whether the user profile for the member is shared or hidden from other members of the online community (e.g., by making the user profile "public" or "private" within the online community).

In certain examples, host facility 102 may be configured to use the profile of a member to predict movies in which the user may be interested based on information included in the profile of the member. Host facility 102 may be further configured to recommend the predicted movies to the member.

In certain examples, host facility 102 may be configured to connect members who have similar user profiles (e.g., user profiles that share predefined attributes), such as by designating relationships between the members and/or by facilitating hosted online communications and/or other communications between the members. Host facility 102 may be further configured to share information between connected members, such as by recommending movies to connected members based on information included in the user profiles of the members.

Host facility 102 may be configured to share data maintained by host facility 102 in relation to hosting an online community. For example, host facility 102 may make such data, which may include any of the examples of online community data described herein, available for access by media delivery facility 104.

Media delivery facility 104 may be configured to provide a media delivery service and to deliver media content to end users of the media delivery service, such as by streaming media content to the end users. For example, media delivery facility 104 may be configured to receive requests for media content and to respond to the requests by streaming (e.g., on-demand narrowcast streaming) the requested media content to user devices associated with the requesting end users.

Media delivery facility 104 may be configured to provide a peer-to-peer media streaming event to a group of members of a hosted online community (e.g., an online community hosted by host facility 102) based on data associated with the online community. To this end, media delivery facility 104 may be configured to access, from host facility 102, data associated with an online community hosted by host facility 102. Media delivery facility 104 may be configured to access the data from host facility 102 in any suitable way, such as by requesting and receiving the data from host facility 102. The data accessed by media delivery facility 104 for use in providing a peer-to-peer media streaming event may include any of the exemplary online community data described herein.

The providing of a pure-to-peer media streaming event to a group of online community members may include media delivery facility 104 performing one or more of the operations described herein to facilitate access by the group of online community members to streamed media content, with at least some members included in the group receiving the streamed media content by way of a peer-to-peer streaming configuration. Examples of such operations will now be described.

Media delivery facility 104 may be configured to schedule a streaming of a media program during a time slot. For example, a new premium high-definition movie may become available for streaming by media delivery facility 104, and media delivery facility 104 may schedule a streaming of the movie during a particular future time slot (e.g., during a time period at a particular date and time).

Media delivery facility 104 may define the scheduled streaming of the media program to require a minimum number of participants (i.e., a "floor") and/or to be limited to a maximum number of participants (i.e., a "cap"). If at least the minimum number of participants agree to participate in the scheduled streaming of the media program during the time slot, media delivery facility 104 may be configured to execute the streaming of the media program during the time slot. Conversely, if fewer than the minimum number of participants agree to participate in the scheduled streaming of the media program during the time slot, media delivery facility 104 may cancel and not execute the streaming of the media program during the time slot. If a maximum number of participants agree to participate in the scheduled streaming of the media program during the time slot, media delivery facility 104 may close invitations to the streaming event such that no other users may be added to the list of participants in the scheduled streaming of the media program during the time slot. Alternatively, users who agree to participate after the cap has been reached may be placed on a wait list and may be used as substitutes for any of the other users who withdraw their agreement to participate in the streaming event. A withdrawal may occur in various ways, such as by a user expressly indicating an intent to withdraw from the event, by a user not participating in the streaming event, or by a user or his or her user device not participating in operations associated with the streaming event (e.g., a user device not responding to event set up communications from media delivery facility 104).

Media delivery facility 104 may be configured to invite members of a hosted online community to participate in the schedule streaming of the media program. The inviting may be performed in any suitable way and may be based on data associated with the online community. Accordingly, media delivery facility 104 may leverage one or more attributes of the online community (e.g., statuses of members within the community, relationships between members within the community, computing resources of user devices associated with members of the community, etc.) to invite members of the online community to participate in a peer-to-peer media streaming event.

To illustrate, media delivery facility 104 may use data associated with the online community to identify one or more particular members of the online community to whom to send initial invitations to participate in the schedule streaming of the media program during the time slot. As an example, media delivery facility 104 may use data associated with the online community to identify a top tier of contributing members of the online community and to send initial invitations to the members included in the top tier of the contributing members of the online community. As another example, media delivery facility 104 may identify a particular member as a leader within the online community and to send an initial invitation to the identified leader member. If the leader member accepts the invitation, media delivery facility 104 may designate the leader member as a leader of the streaming event. Media delivery facility 104 may send invitations to members of the online community in any suitable way, such as by sending data representative of the invitations to user devices associated with the members.

A leader member of the online community who receives an invitation from media delivery facility 104 may send the invitation to other members of the online community. For example, the leader member of the online community who is in receipt of the invitation may select one or more of his or her followers within the online community to whom the invitation will be sent. The invitation may then be sent to the selected followers of the leader member in any suitable way, such as by a user device associated with the leader member sending the invitation to the followers, or by the user device associated with the leader sending data representative of the selected followers to a server subsystem that then sends the invitation to the followers.

In this or similar manner, media delivery facility 104 may use data associated with the online community to create and/or facilitate an invitation chain by which members of the online community may receive invitations to participate in a peer-to-peer media streaming event. The invitation may trickle down to members of the online community by way of a member relationship hierarchy within the online community.

Figure 2:
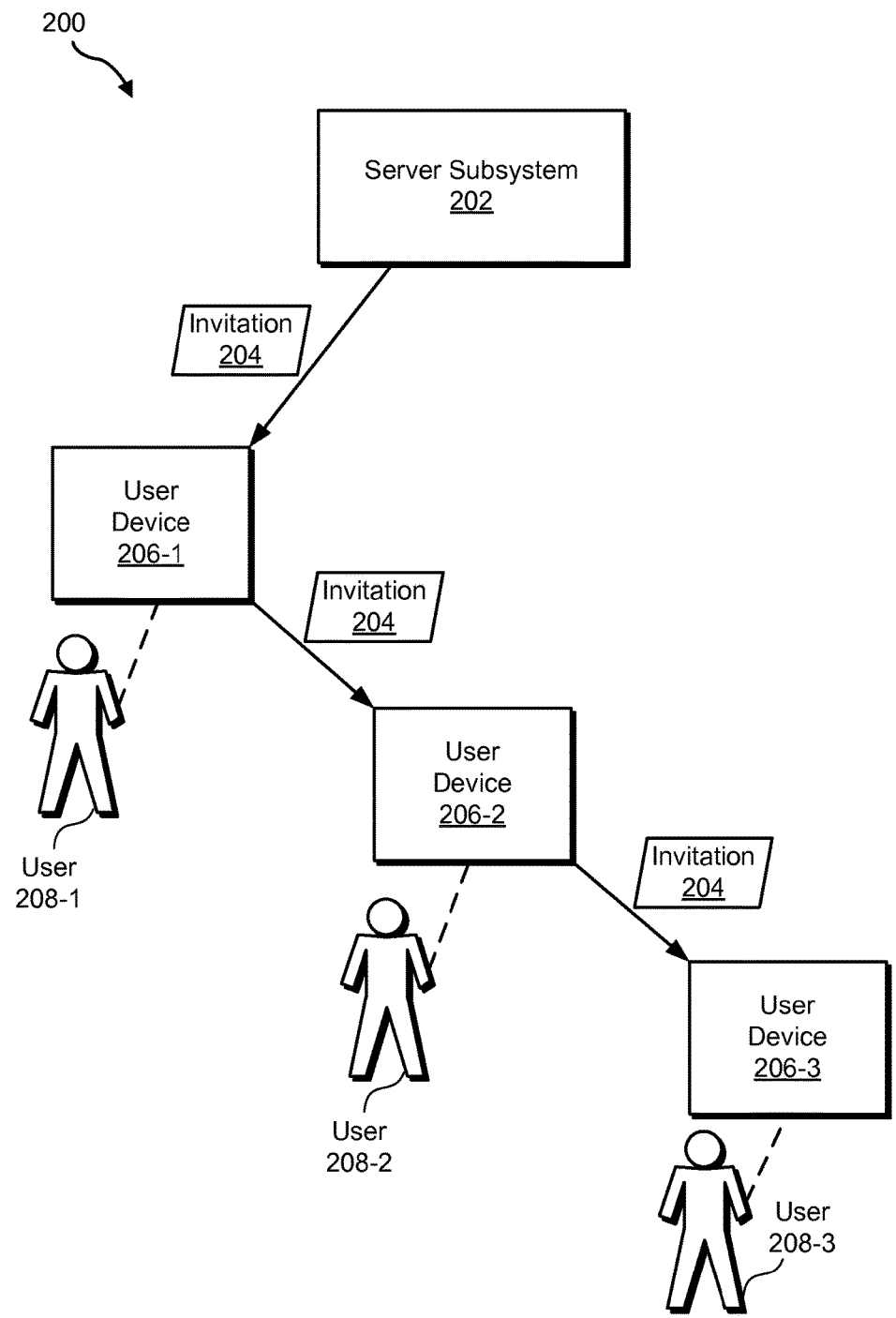
FIG. 2 illustrates an exemplary invitation chain by which members of an online community may be invited to participate in a scheduled streaming of a media program according to principles described herein.

FIG. 2 illustrates an exemplary invitation chain 200 by which certain members of an online community are hierarchically invited to participate in a scheduled streaming of a media program. As shown, a server subsystem 202 (which may be implemented by one or more servers and/or other types of computing devices) may send an invitation 204 to first user device 206-1 associated with a first user 208-1, which sends the invitation 204 to a second user device 206-2 associated with a second user 208-2, which sends the invitation 204 to a third user device 206-3 associated with a third user 208-3. In certain examples, user 208-2 may be a follower of user 208-1 and user 208-3 may be a follower of user 208-2 within the online community.

Based on one or more attributes of the online community indicated by online community data 110, media delivery facility 104 may select user 208-1 as a potential leader of the scheduled streaming of the media program and direct server subsystem 202 to send invitation 204 to user device 206-1. User 208-1 may receive invitation 204 and choose to act as the leader of the scheduled streaming of the media program. User 208-1 may invite one or more other members of the online community to participate in the scheduled streaming of the media program. For example, user 208-1 may elect to forward the invitation 204 to user 208-2 (who may be a follower of user 208-1), and user 208-2 may receive and elect to forward the invitation 204 to user 208-3 (who may be follower of user 208-2). A user 208 in receipt of the invitation 204 may provide input (by way of his or her user device 206) to indicate one or more other users 208 to whom the invitation 204 will be forwarded. In this or a similar manner, the invitation 204 may trickle down an invitation chain within the online community, wherein data associated with the online community is used to create and/or facilitate the chain along which the invitation 204 is distributed.

In certain examples, an invitation such as invitation 204 may be configured to expire at a predetermined time. For example, the invitation may be configured to expire a certain period of time after distribution of the invitation is initiated by media delivery facility 104, at a specified date and time, or at any other predetermined time before the timeslot of the scheduled streaming of the media program.

In certain examples, media delivery facility 104 may be configured to allocate a participant cap for a peer-to-peer media streaming event among members of the online community. For example, an overall cap for an event may be one hundred participants. Media delivery facility 104 may send an initial invitation to participate in the event to both a first leader and a second leader in the online community. Media delivery facility 104 may allocate the first leader a certain portion of the overall cap and the second leader another portion of the overall cap. For example, media delivery facility 104 may allocate a sub-cap of sixty participants to the first leader and a sub-cap of forty participants to the second leader. Accordingly, participation of members who receive the invitation by way of the first leader may be capped at sixty members and participation of members who receive the invitation by way of the second leader may be capped at forty members.

Media delivery facility 104 may be configured to use data associated with the online community to determine how to allocate an overall cap for an event between members of the online community. For example, data associated with the online community may indicate that the first leader has fifty percent more followers than the second leader has in the example described above. Media delivery facility 104 may access and use this data to allocate the overall cap between the two leaders based on the number of followers of each of the leaders. For instance, based on the data, media delivery facility 104 may allocate a portion of the overall cap to the first leader that is fifty percent more than the portion of the overall cap that is allocated to the second leader.

In certain examples, media delivery facility 104 may be configured to close an event invitation if a participation cap for the event is reached. This may include closing an overall invitation chain if an overall cap for the event is reached or closing an invitation sub-chain if a sub-cap for the event is reached. In the example described above, for example, the overall participation cap of one hundred participants may be reached and the overall invitation chain closed. As another example, a portion of the overall cap allocated to a particular leader invitation sub-chain may be reached and that invitation sub-chain closed (while one or more other invitation sub-chains remain open). For example, a cap of sixty participants allocated to a first leader may be reached, and the invitation sub-chain associated with the first leader may be closed, while an invitation sub-chain associated with the second leader may remain open until the cap of forty participants associated with the second leader is reached.

In certain examples, media delivery facility 104 may be configured to cancel an event invitation if a participation floor for the event is not reached. This may include canceling an overall invitation chain if an overall floor for the event is not reached. For example, an event may be defined to have a floor of twenty participants. If twenty participants do not agree to participate in the event before the event invitation expires and/or before the timeslot of the event, media delivery facility 104 may cancel the invitation event and the event.

While certain examples of providing a peer-to-peer media streaming event are described herein in relation to a single timeslot for the event, in other examples media delivery facility 104 may be configured to schedule multiple events for streaming a media program during multiple timeslots. This may allow a member of an online community to select a preferred timeslot during which to participate in a peer-to-peer media streaming event. For example, a leader member of the online community may receive an invitation that notifies the leader member of multiple peer-to-peer media streaming events at multiple timeslots. The leader member may select one of the timeslots that will work for him or her and/or for his or her followers and forward invitations for the event scheduled for the selected timeslot.

Members of the online community who receive an invitation to a peer-to-peer media streaming event may choose whether to accept the invitation. By accepting the invitation, a member agrees to participate in the event.

An invitation acceptance may be provided by a member to media delivery facility 104 in any suitable way. For example, a member in receipt of an invitation may indicate an acceptance of the invitation by using a user device to provide user input indicating an acceptance of the invitation. The user device may detect the user input and respond by sending data representative of the acceptance to a source of the invitation (e.g., to media delivery facility 104 and/or server subsystem 202).

Media delivery facility 104 may be configured to receive an invitation acceptance from each member who has accepted an event invitation and thereby agreed to participate in an event. From the received invitation acceptances for an event, media delivery facility 104 may be configured to define a group of members of the online community who have agreed to participate in the event. The group may include all or any subset of the members of a hosted online community. As used herein, a "group" of members of the online community refers to members of the online community who have agreed to participate in a streaming event.

Based on the received invitation acceptances and/or on the defined group of members associated with the event, media delivery facility 104 may be configured to reserve access to a streaming of a media program during a scheduled timeslot by the group of members. Media delivery facility 104 may reserve access for the group of members in any suitable way.

Media delivery facility 104 may be configured to determine, based on the reserved access by the group of members and/or on data associated with the online community, a peer-to-peer streaming configuration to be used to stream the media program to the group of members during the timeslot. A peer-to-peer streaming configuration may be utilized to stream the media program to at least a subset of the members included in the group in accordance with a peer-to-peer streaming arrangement defined by the configuration. For example, a peer-to-peer streaming configuration may define peer-to-peer streaming relationships between members of the group (e.g., a peer-to-peer streaming chain and/or hierarchy between user devices associated with members of the group).

Figure 3:
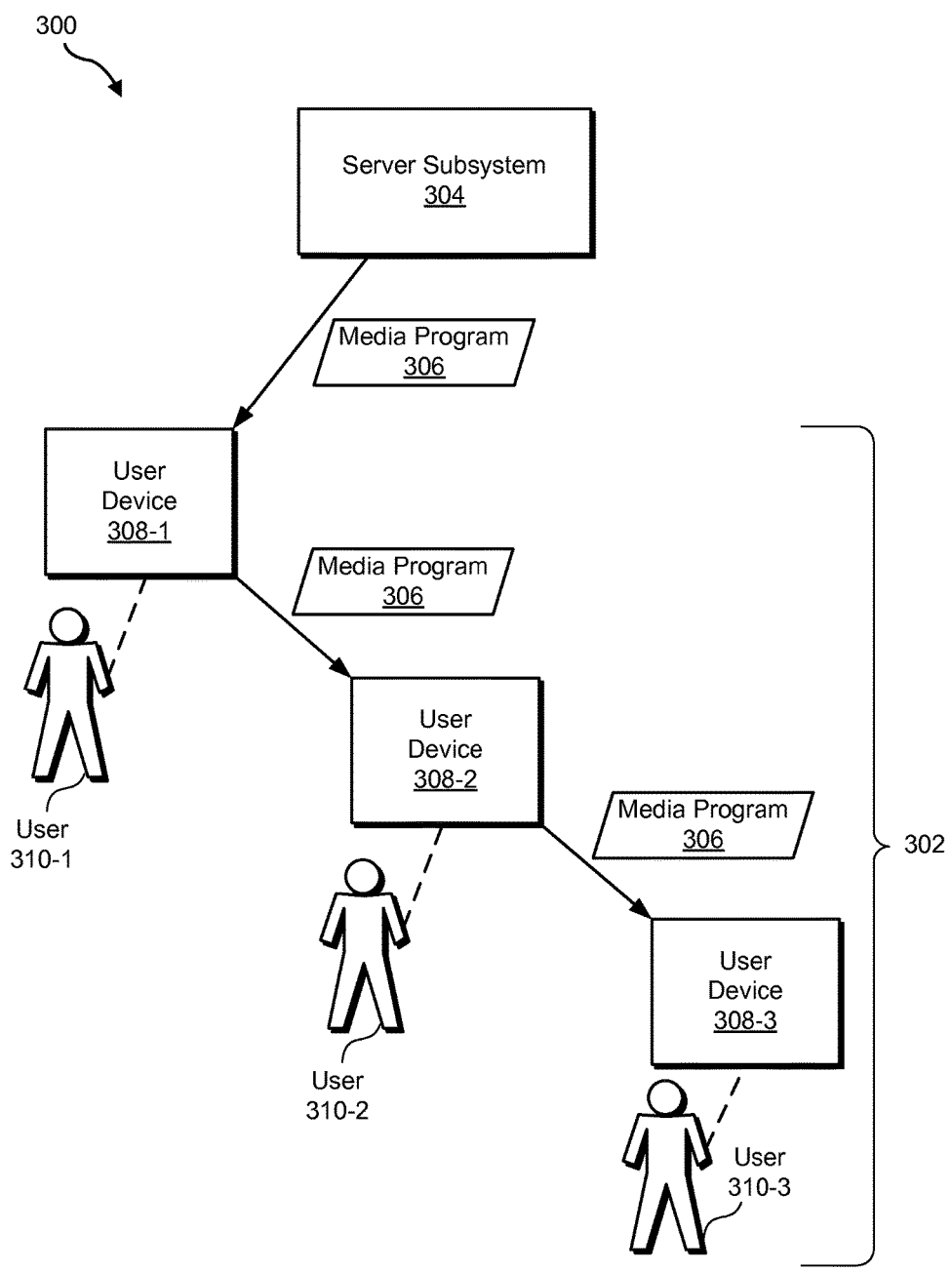
FIG. 3 illustrates an exemplary media streaming configuration that may be used to deliver a media program to a group of members of an online community according to principles described herein.

To illustrate, FIG. 3 shows an exemplary media streaming configuration 300 that includes a peer-to-peer streaming configuration 302. In the illustrated example, a server subsystem 304 may stream a media program 306 to a first user device 308-1 associated with a first user 310-1. While the first user device 308-1 is receiving the streamed media program 306 from the server subsystem 304, the first user device 308-1 may stream the media program 306 from the first user device 308-1 to a second user device 308-2 associated with a second user 310-2 included in the group of members. While the second user device 308-2 is receiving the streamed media program 306 from the first user device 308-1, the second user device 308-2 may stream the media program 306 from the second user device 308-2 to a third user device 308-3 associated with a third user 310-3 included in the group of members. Thus, in configuration 302, the media program 306 may be streamed along a chain of group members in a peer-to-peer manner. The peer-to-peer streaming may offload processing from server subsystem 304 to user devices 306 (as compared to server subsystem 304 streaming the media program 306 directly to each of the user devices 308) and thereby conserve resources of server subsystem 304 and/or resources of a network by way of which server subsystem 304 communicates with user devices 308.

In certain alternative examples, media delivery facility 104 may determine a different peer-to-peer streaming configuration to use to stream a media program to a group of members of an online community. For example, if another peer-to-peer streaming configuration would better conserve resources and/or provide a quality user experience, media delivery facility 104 may select the other peer-to-peer streaming configuration.

Figure 4:
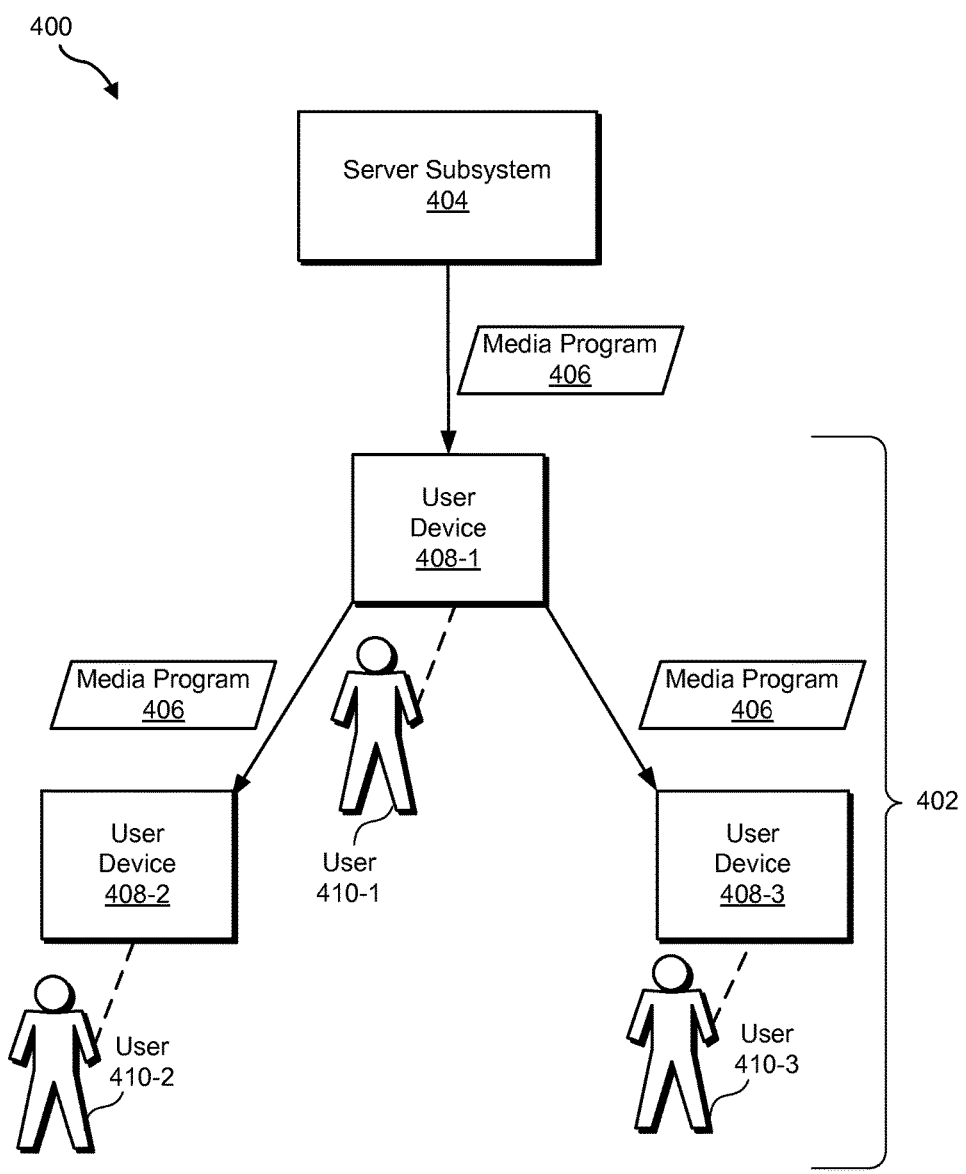
FIG. 4 illustrates another exemplary media streaming configuration that may be used to deliver a media program to a group of members of an online community according to principles described herein.

FIG. 4 shows another exemplary media streaming configuration 400 that includes a different peer-to-peer streaming configuration 402. In the illustrated example, a server subsystem 404 may stream a media program 406 to a first user device 408-1 associated with a first user 410-1. While the first user device 408-1 is receiving the streamed media program 406 from the server subsystem 404, the first user device 408-1 may stream the media program 406 from the first user device 408-1 to both a second user device 408-2 associated with a second user 410-2 included in the group of members and a third user device 408-3 associated with a third user 410-3 included in the group of members.

In certain examples, peer-to-peer streaming configuration 402 may be preferred by media delivery facility 104 over peer-to-peer streaming configuration 302. For example, second user device 408-2 may have limited computing resources and/or first user device 408-1 may have significantly more computing resources than second user device 408-2, such that directing first user device 408-1 to stream the media program 406 to both the second user device 408-2 and the third user device 408-3 may produce a more favorable user experience than would be produced if the second user device 408-2 were directed to stream the media program to the third user device 408-3.

Media delivery facility 104 may be configured to determine a peer-to-peer streaming configuration for use to stream a media program based on any predefined conditions and/or factors, including any factors associated with the group of members and/or indicated by data associated with an online community. For example, media delivery facility 104 may determine a peer-to-peer streaming configuration based at least in part on one or more attributes of the online community specified by online community data.

As an example, media delivery facility 104 may determine a peer-to-peer streaming configuration based at least in part on statuses of one or more members included in the group of members within the online community. For instance, a leader within the online community may be assigned a particular role in a peer-to-peer streaming configuration, and a follower of the leader may be assigned a different role within the configuration.

As another example, media delivery facility 104 may determine a peer-to-peer streaming configuration based at least in part on relationships between one or more members included in the group of members within the online community. For instance, a leader-follower relationship may be used by media delivery facility 104 to determine a peer-to-peer streaming configuration (e.g., in which a leader member streams a media program to a follower member).

As another example, media delivery facility 104 may determine a peer-to-peer streaming configuration based at least in part on computing resources of user devices associated with one or more members included in the group of members. For instance, information about computing resources of a user device associated with a member may be used by media delivery facility 104 to determine a peer-to-peer streaming configuration (e.g., in which the user device associated with the member has a particular role).

These factors are illustrative only. Any additional or alternative factors, or any combination of factors, may be used by media delivery facility 104 to determine a peer-to-peer streaming configuration to be used by media delivery facility 104 to stream a media program.

Media delivery facility 104 may determine one or more of the factors used to determine a peer-to-peer streaming configuration from data associated with an online community. Such data may be accessed from host facility 102 as described herein.

Additionally or alternatively, media delivery facility 104 may access such data from user devices. For example, media delivery facility 104 may be configured to send one or more messages to the user devices to request and/or derive information about the resources of the user devices. In certain examples, media delivery facility 104 may send such messages to user devices associated with members included in the group of members after defining the group of members from received invitation acceptances as described above. The user devices may be configured to receive the request messages and respond by providing the requested information to media delivery facility 104. From these communications, or from any attribute of the communications (e.g., packet delay and/or loss), media delivery facility 104 may determine resources of one or more user devices and determine a peer-to-peer streaming configuration based at least in part on the determined resources.

In certain examples, media delivery facility 104 may be configured to send a resource information request message to a user device in response to media delivery facility 104 receiving an invitation acceptance from the user device and/or at a certain time before the actual streaming of a media program begins at the scheduled timeslot.

Additionally or alternatively, media delivery facility 104 may be configured to use historical streaming data to determine computing resources of user devices. For example, media delivery facility 104 may maintain information in media delivery data 112 that indicates or can be used by media delivery facility 104 to derive information descriptive of resources of user devices. Media delivery facility 104 may maintain a log of such information in association with streaming of media content to user devices. The historical information in the log may be used subsequently by media delivery facility 104 to determine computing resources of the user devices and to use this information to determine a peer-to-peer streaming configuration to be used for a future media streaming event.

Media delivery facility 104 may be configured to execute the scheduled streaming of the media program to the members included in the group of members during the timeslot. For example, media delivery facility 104 may initiate streaming of the media program to user devices associated with the members of the group by streaming the media program to one or more of the user devices.

The streaming of the media program may utilize the peer-to-peer streaming configuration determined by media delivery facility 104 to stream the media program to at least a subset of the members included in the group of members of the online community. That is, the streaming may be executed in accordance with the determined peer-to-peer streaming configuration.

To illustrate, if media delivery facility 104 has determined that peer-to-peer streaming configuration 302 shown in FIG. 3 is to be used to stream the media program to the group of members during the timeslot, media delivery facility 104 may execute the streaming in accordance with the peer-to-peer streaming configuration 302. For example, media delivery facility 104 may direct server subsystem 304 to stream the media program 306 to user device 308-1. While user device 308-1 is receiving the streamed media program 306 from server subsystem 304, the user device 308-1 may present (e.g., play back) the media program for experiencing by user 310-1 and media delivery facility 104 may direct user device 308-1 to stream (e.g., upload) the media program 306 to user device 308-2. While user device 308-2 is receiving the streamed media program 306 from user device 308-1, the user device 308-2 may present the media program for experiencing by user 310-2 and media delivery facility 104 may direct user device 308-2 to stream the media program 306 to user device 308-8. In this or a similar manner, media delivery facility 104 may utilize peer-to-peer streaming configuration 302 to stream the media program 306 to at least a subset of the members of the group (e.g., to users 310-2 and 310-3).

Alternatively, if media delivery facility 104 has determined that peer-to-peer streaming configuration 402 shown in FIG. 4 is to be used to stream the media program to the group of members during the timeslot, media delivery facility 104 may execute the streaming in accordance with the peer-to-peer streaming configuration 402. For example, media delivery facility 104 may direct server subsystem 404 to stream the media program 406 to user device 408-1. While user device 408-1 is receiving the streamed media program 406 from server subsystem 404, the user device 408-1 may present the media program 406 for experiencing by user 410-1 and media delivery facility 104 may direct user device 408-1 to stream the media program 406 to both user device 408-2 and user device 408-3. In this or a similar manner, media delivery facility 104 may utilize peer-to-peer streaming configuration 402 to stream the media program 406 to at least a subset of the members of the group (e.g., to users 410-2 and 410-3).

By utilizing a peer-to-peer streaming configuration to deliver a media program to at least a subset of members of a group of members who have agreed to participate in a scheduled streaming event, media delivery facility 104 may conserve one or more resources, such as described herein. System 100 may be configured to provide incentives to group members for participation in peer-to-peer media streaming events. The incentives may help to increase participation in the peer-to-peer streaming events and thereby increase conservation of resources used to deliver media content to users. The incentives may also help to increase user participation in a hosted online community, and thereby increase the value of services provided by and/or through the online community.

Returning to FIG. 1, incentive management facility 106 may be configured to provide incentives to members of a hosted online community. The incentives may be in any form configured to incentivize member behavior and may be provided to the members in any suitable way. For example, incentive management facility 106 may provide incentive data representative of incentives to user devices of the members of the online community. The incentive data may include information configured to inform members of potential for earning rewards and/or designed to motivate members to perform certain actions to earn rewards. For example, the incentive data may inform a member of requirements that may be fulfilled by the member to earn a reward. Additionally or alternatively, the incentive data may include information configured to inform members of earned rewards. The potential for earning rewards and/or the actual earning of rewards may motivate the members to perform certain actions, such as actions that may be lead to additional rewards being earned. The members may utilize their respective user devices to access, use, and/or be informed of the incentives provided by incentive management facility 106.

Examples of incentives that may be provided by incentive management facility 106 include, without limitation, discounted and/or subsidized access to a service (e.g., discounted service subscription fees such as a free month of access to a service), discounted access to media content (e.g., free or otherwise discounted access to a media program), credit for use toward accessing media content (e.g., a credit for use toward renting or purchasing media content), and a mystery reward configured to be revealed after a member satisfies one or more predefined criteria to earn the reward (e.g., a digitally locked virtual treasure chest configured to be opened after satisfaction of one or more predefined criteria to reveal a reward). Additional or alternative forms of incentives may be provided in other examples.

In certain examples, incentive management facility 106 may be configured to provide incentives to members of an online community for participation in peer-to-peer media streaming events. For example, media delivery facility 104 may provide a peer-to-peer media streaming event to a group of members in any of the ways described herein, and incentive management facility 106 may provide an incentive to the group of members for participation in the event. To illustrate, the event may include streaming of a media program to the group of members during a timeslot, and incentive management facility 106 may provide the group of members with an incentive, such as discounted access to the media program, to reward the group's participation in the event (e.g., to reward the group's participation in the streaming of the media program). Such an incentive may incentivize members of the online community to participate in peer-to-peer media streaming events.

Incentive management facility 106 may be configured to provide different incentives to members included in the group of members. For example, incentive management facility 106 may provide different incentives based on levels of participation of the members of the group in a peer-to-peer media streaming event. The levels of participation may be measured in any suitable way. For example, the levels of participation may be based on levels of computing resources of the members that are used for streaming media content in accordance with a peer-to-peer streaming configuration and/or on levels of participation in inviting and/or signing up members to participate in a peer-to-peer media streaming event (e.g., the number of followers of a member who are invited, who agree to participate, and/or who actually participate in a peer-to-peer media streaming event).

To illustrate one example, a member whose user device uploads a media program to one or more other user devices as part of a peer-to-peer streaming configuration may be provided with a certain incentive that is greater in value than an incentive that is provided to another member whose user device only receives the streamed media program but does not upload the media program to another user device as part of the peer-to-peer streaming configuration. For example, a first user may be provided with a larger discount for access to a media program than is provided to one or more other users. To illustrate, in streaming configuration 300 shown in FIG. 3, user 310-1 or user 310-2 may be provided with an incentive that is greater in value than a different incentive provided to user 310-3. In streaming configuration 400 shown in FIG. 4, user 410-1 may be provided with an incentive that is greater in value than a different incentive provided to users 410-2 and 410-3.

Incentive management facility 106 may be configured to provide different incentives based on one or more other factors such as online community statuses of and/or relationships between members included in the group of members who agreed to participate in a peer-to-peer media streaming event. For example, a member who has a "senior leader" status in an online community may be provided with a different reward than is provided to a member who has a "junior member" status in the online community. As another example, a leader member and a member who follows the leader member may be provided with different incentives (e.g., the leader member may be provided with a greater incentive than is provided to the follower member).

Incentive management facility 106 may be configured to provide different incentives based on acceptance of invitations to participate in a peer-to-peer media streaming event. For example, incentive management facility 106 may be configured to provide different incentives to different members of the group based on when the members accepted the invitation to participate in the event. For instance, a first member may accept the invitation earlier than a second member accepts the invitation, and incentive management facility 106 may provide the first member with a greater incentive than is provided to the second member.

In certain examples, incentive management facility 106 may be configured to allow a member of the group to concede his or her incentive to one or more other members of the group. To illustrate, incentive management facility 106 may be configured to provide an overall discount to a group of members for access to a media program streamed as part of a peer-to-peer media streaming event. Incentive management facility 106 may allocate the overall discount among members of the group in any suitable way, including by using any of the factors described herein to determine how to allocate the discount. A leader of the group may wish to concede his allocated portion of the discount and may provide input to indicate this wish to incentive management facility 106. Incentive management facility 106 may receive the request from the leader and respond by reallocating the overall discount among other members of the group.

In certain examples, incentive management facility 106 may allow the leader to provide instructions that will be taken into account by incentive management facility 106 when reallocating the leader's portion of the overall discount. For instance, the leader may provide input instructing incentive management facility 106 to reallocate the leader's portion of the overall discount to the leader's followers or to one or more specific followers of the leader within the online community.

Additionally or alternatively, incentive management facility 106 may be configured to provide incentives to members of a hosted online community to incentivize participation in the online community (e.g., to incentivize and/or reward participation in the online community). For example, a host of the online community may want to incentivize submission by members of quality information about media content (e.g., user reviews, recommendations, and/or ratings of media content) to the online community. The incentives may help to increase motivation of one or more members of the online community to participate in the online community by creating and sharing reviews, recommendations, and/or ratings of media content with other members of the online community. Accordingly, by providing incentives for participation in the online community, system 100 may collect information about media content at a faster rate than if no incentives were provided, thereby building up the quantity of online community information in a way that makes the online community a valuable source of information for members of the online community. In addition, the quality of the information shared by community members may be increased by incentive management facility 106 providing incentives designed to reward community members for the quality of their contributions to the online community.

Examples of incentive management facility 106 providing incentives for participation in a hosted online community will now be described. In certain examples, incentive management facility 106 may be configured to assign a member a contribution score based on contributions of the member to the online community. The member's contribution score may be measured by incentive management facility 106 based on the quantity and/or quality of reviews, recommendations, and/or ratings of media content submitted to the online community by the member. In certain examples, the quality of the member's contribution may be measured based on feedback from other members, such as indications from other members that the member's contribution is helpful. The member's contribution score may represent a value of the member within the online community (e.g., from the perspective on a host of the online community).

Incentive management facility 106 may be configured to rank and/or classify members of the online community based on their contribution scores. For example, incentive management facility 106 may be configured to identify a top tier of members, such as by identifying members who have contribution scores that are greater than a predetermined threshold contribution score and/or are who are within a predetermined top-tier percentile of contribution scores of all members (e.g., within the top five to ten percent of contribution scores of members). Incentive management facility 106 may classify these members as top-tier contributing members. Other tiers of members may be similarly identified.

Incentive management facility 106 may be configured to rank and/or classify members, such as by identifying a top tier of contributing members at any suitable time. For example, incentive management facility 106 may rank and/or classify members periodically (e.g., weekly, monthly, yearly, etc.), at the end of a predetermined time period, and/or in response to an occurrence of a predetermined event.

Incentive management facility 106 may provide an incentive to the identified top tier of contributing members. For example, incentive management facility 106 may transmit data representative of and/or information about an incentive to user devices associated with the top tier of members. The incentive may include any of the exemplary incentives described herein. To illustrate one example, the incentive may include a digitally locked virtual treasure chest and/or a digital key usable by the members to unlock the digitally locked virtual treasure chest to access a reward included therein (e.g., a credit for use to rent or purchase movies).

In certain examples, incentive management facility 106 may be configured provide incentives based on the number of followers linked to the members within the online community. To illustrate, a first member of the online community may receive a request from a second member to follow the first member. The first member may indicate whether to accept or reject the request. If the request is accepted, a leader-follower relationship is established by hosting facility 102 between the members, and the second member is provided with access to information posted to the online community by the first member. For example, the second member may be provided with access to media content reviews, recommendations, and/or ratings submitted to the online community by the first user.

Members of the online community may have various numbers of followers, and incentive management facility 106 may be configured to selectively provide incentives to members based on the numbers of members following the members. In certain examples, for instance, incentive management facility 106 may provide an incentive to a member who has attained a predefined level of leadership (e.g., a predetermined number of followers such as one hundred followers). The incentive may indicate to the member that a reward will be provided to the member if another level of leadership is attained (e.g., if the member attains a greater predetermined number of followers such as two hundred followers) within a predetermined period of time (e.g., within ten weeks). In response to the member attaining the greater predetermined number of followers, incentive management facility 106 may provide the member with the reward, such as by providing the member with a digital key to unlock a digitally locked virtual treasure chest to access the reward.

In certain examples, incentive management facility 106 may be configured provide incentives based on degrees to which members allow their posted content to be shared within the online community. For example, a member may be allowed to control the level of disclosure to be applied to content posted by the member. For instance, a member may choose to restrict the disclosure of his or her postings and/or other information to members of the online community who follow the member. This may be a particular level of disclosure within the online community. Alternatively, the member may choose to allow his or her postings and/or other information to be shared with all members of the online community. This may be a different level of disclosure within the online community.

Incentive management facility 106 may be configured to provide different incentives based on the levels of disclosure associated with members of the online community. For example, incentive management facility 106 may provide a greater incentive to a member who allows open access to his or her postings than is provided to a member who restricts access to his or her postings.

In certain examples, incentive management facility 106 may be configured provide incentives based on participation competition between members of the online community. As an example, incentive management facility 106 may provide an incentive to multiple members who have attained a predefined level of leadership (e.g., a predetermined number of followers such as one hundred followers). The incentive may indicate to the members that they are contestants in a competition and that a reward will be provided to the member who first attains another level of leadership (e.g., to the member who is first to attain a greater predetermined number of followers such as two hundred followers). In response to the member attaining the greater predetermined number of followers, incentive management facility 106 may provide the member with the reward, such as by providing the member with a digital key to unlock a digitally locked virtual treasure chest to access the reward.

Alternatively, the incentive may indicate to the members that they are contestants in a competition and that a reward will be provided to the member who adds the greatest number of new followers within a predetermined time period (e.g., within the next three months). At the end of the time period, incentive management facility 106 may provide the member who adds the most new followers with the reward, such as by providing the member with a digital key to unlock a digitally locked virtual treasure chest to access the reward.

During a competition between members, contestants may be able to track the progress of the contestants. For example, a contestant may select an icon of a virtual treasure chest to access information indicating the progress of all contestants in the competition.

In certain examples, incentive management facility 104 may be configured to regroup losers of past competitions to be contestants in a new competition. The regrouping may be based on current statuses of members within the community (e.g., current leadership levels of the members within the online community).

Figure 5:
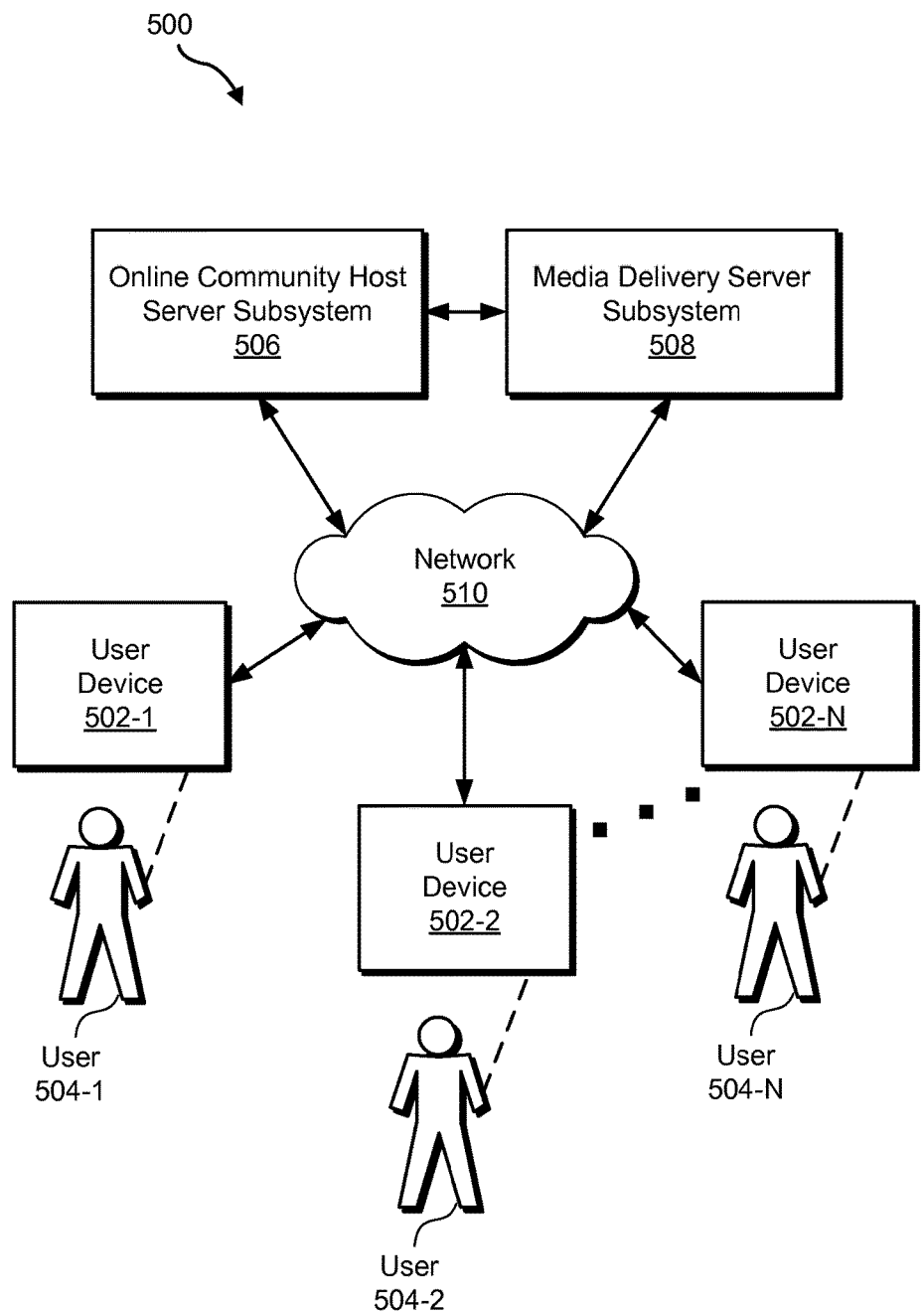
FIG. 5 illustrates an exemplary implementation of the system of FIG. 1 according to principles described herein.

FIG. 5 illustrates an exemplary implementation 500 of system 100. As shown, implementation 500 may include user devices 502 (e.g., user devices 502-1 through 502-N) associated with users 504 (e.g., users 504-1 trough 504-N), who may be end users of one or more services that may be accessed by user devices 502. For example, users 504 may be members of an online community hosted by an online community host server subsystem 506 ("community host subsystem 506"). Accordingly, users 504 may utilize user devices 502 to participate in the hosted online community in any of the ways described herein. As another example, users 504 may be end users of one or more media delivery services (e.g., media-on-demand and/or media streaming services) provided by a media delivery server subsystem 508 ("media subsystem 508"). Accordingly, users 504 may utilize user devices 502 to access media content provided by way of a media delivery service.

User devices 502 (as well as the other user devices 206, 308, and 408 described herein) may include or be implemented by any end-user computing devices configured to access one or more services provided by community host subsystem 506 and/or media subsystem 508. Examples of user devices 502 may include, but are not limited to, mobile phones, smart phones, tablet computers, personal computers, mobile computing devices, vehicular computing devices, set-top box devices, gaming console devices, and media player devices.

User devices 502 may communicate with community host subsystem 506 and/or media subsystem 508 using any suitable communication technologies, including communication technologies that support participation of users 504 in an online community hosted by community host subsystem 506 and/or delivery of media content from media subsystem 508 to one or more user devices 502. Examples of such communication technologies may include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), in-band and out-of-band signaling technologies, wide area network communication technologies, Internet communication technologies, Hypertext Transfer Protocol ("HTTP"), progressive media streaming technologies, adaptive rate HTTP media streaming technologies, and other suitable communications and/or data transport technologies (e.g., other media streaming technologies), or any combination or sub-combination thereof.

In certain examples, user devices 502 may communicate with community host subsystem 506 and/or media subsystem 508 by way of a network 510, which may include one or more networks provided by one or more appropriately configured network devices (and communication links thereto) and over which media content may be transported between computing devices such as from media subsystem 508 to one or more user devices 502 and/or from one user device 502 to another user device 502. Network 510 may include, but is not limited to, a mobile phone network (e.g., a cellular phone network, a 3G data network, a 4G data network, etc.), a satellite media broadcasting network, a terrestrial media broadcasting network, a wide area network, the Internet, and/or any other network(s) capable of transporting media content between computing devices.

Community host subsystem 506 and media subsystem 508 may include one or more computing devices (e.g., one or more server devices) configured to perform one or more server-side operations described herein.

System 100 may be implemented by implementation 500 in any suitable way. For examples, any of facilities 102-108 may be implemented entirely by community host subsystem 506, entirely by media subsystem 508, by a combination of community host subsystem 506 and media subsystem 508, or distributed across online host subsystem 506, media subsystem 508, and user devices 502. In certain exemplary embodiments, for example, media delivery facility 104 may be implemented entirely by media subsystem 508 or distributed across media subsystem 508 and user devices 502 (e.g., as a server-side application or service provided by media subsystem 508 and a client-side application implemented by user devices 502).

Figure 6:
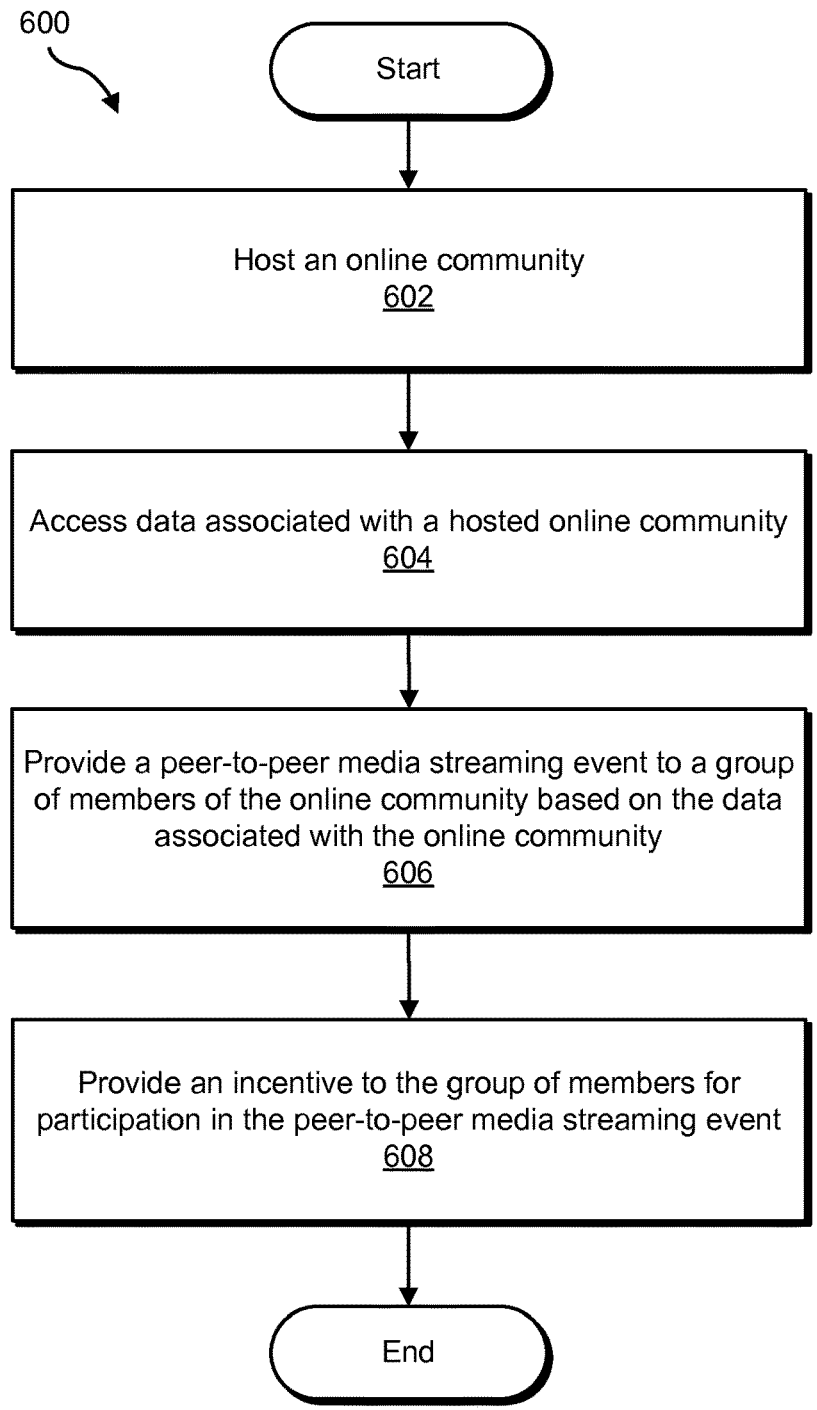
FIGS. 6-8 illustrate exemplary online community based peer-to-peer media streaming methods according to principles described herein.
Figure 7:
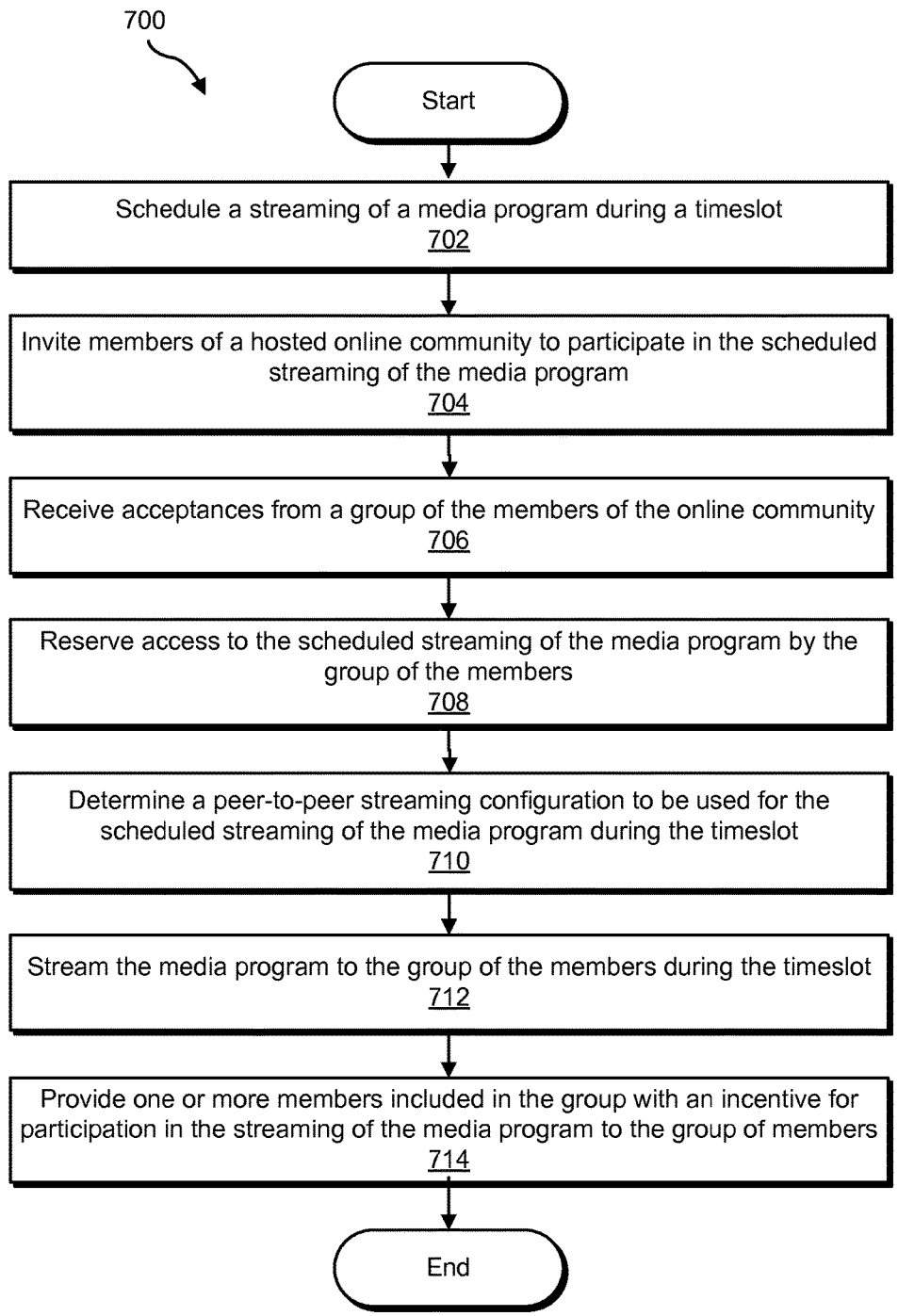
Figure 8:
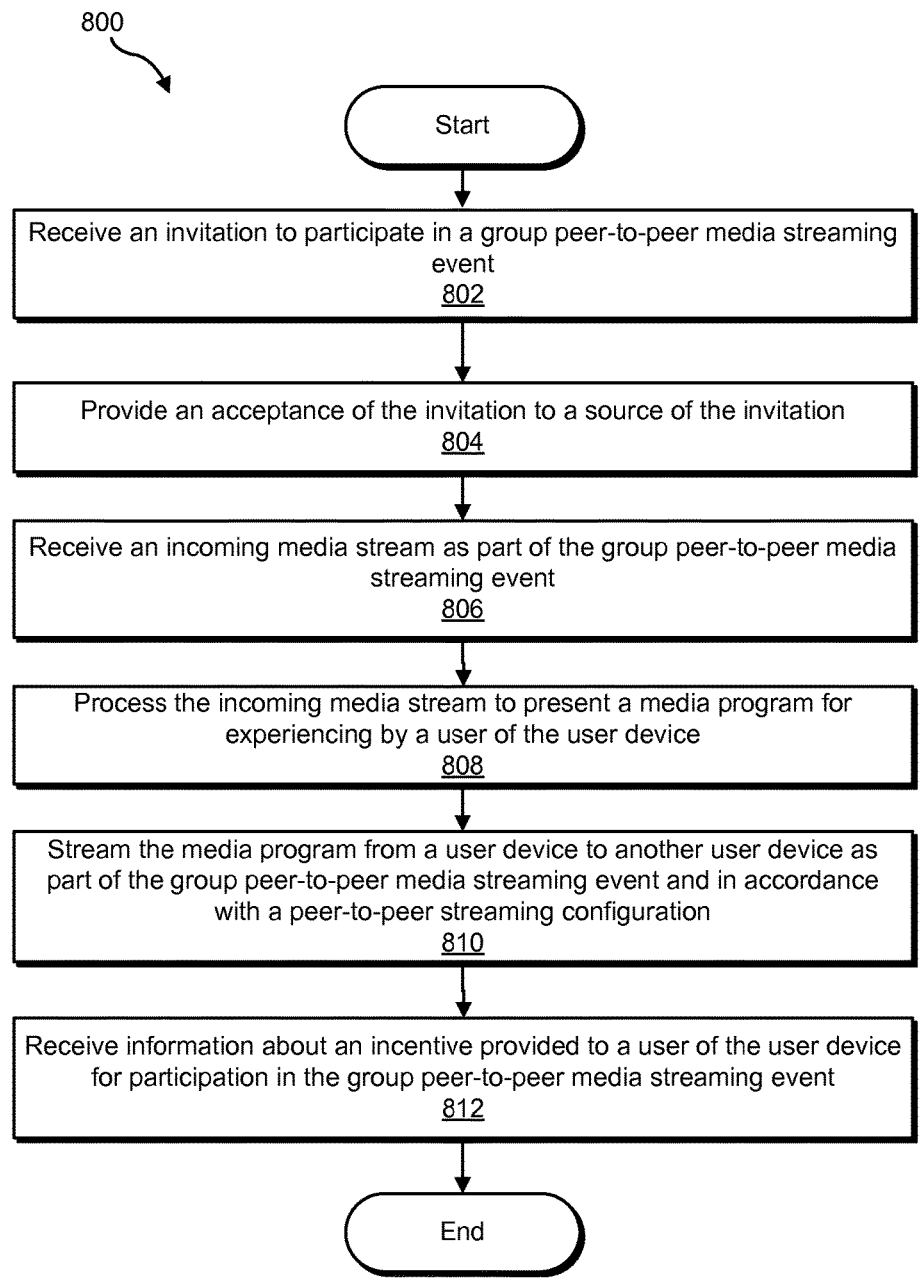

FIGS. 6-8 illustrate exemplary online community based peer-to-peer media streaming methods according to principles described herein. While FIGS. 6-8 illustrate exemplary steps according to certain embodiments, other embodiments may omit, add to, reorder, combine, and/or modify any of the steps shown in FIGS. 6-8. In certain embodiments, one or more of the steps shown in FIGS. 6-8 may be performed by system 100 or one or more components of system 100 and/or implementation 500 (e.g., by a server subsystem and/or a user device).

Turning now to method 600 shown in FIG. 6, in step 602, system 100 hosts an online community. For example, host facility 102 may host an online community comprising a plurality of members, such as described herein.

In step 604, system 100 accesses data associated with a hosted online community. For example, media delivery facility 104 may access online community data 110 maintained by host facility 102 in conjunction with hosting the online community, such as described herein.

In step 606, system 100 provides a peer-to-peer media streaming event to a group of members of the online community based on data associated with the online community. For example, media delivery facility 104 may provide the event to the group of members based on online community data 110. Step 606 may be performed in any of the ways described herein.

In step 608, system 100 provides an incentive to the group of members for participation in the peer-to-peer media streaming event. For example, incentive management facility 106 may provide the incentive to the members of the group, such as described herein. Step 608 may be performed in any of the ways described herein, including, for example, by providing an incentive indicating a potential to earn a reward for participation in the event and/or by providing an incentive indicating that a reward has been earned for participation in the event.

Turning now to method 700 shown in FIG. 7, in step 702, system 100 schedules a streaming of a media program during a timeslot, such as described herein.

In step 704, system 100 invites members of a hosted online community to participate in the scheduled streaming of the media program, such as described herein.

In step 706, system 100 receives invitation acceptances from a group of members of the online community, such as described herein.

In step 708, system 100 reserves access to the scheduled streaming of the media program by the group of members, such as described herein.

In step 710, system 100 determines a peer-to-peer streaming configuration to be used for the scheduled streaming of the media program during the timeslot, such as described herein.

In step 712, system 100 streams the media program to the group of the members during the timeslot in accordance with the peer-to-peer streaming configuration determined in step 710, such as described herein.

In step 714, system 100 provides one or more members included in the group with an incentive for participation in the streaming of the media program to the group of members, such as described herein. For example, incentive management facility 106 may provide one or more members of the group with discounted access to the media program for participating in the streaming of the media program.

In certain examples, step 606 of method 600 of FIG. 6 may be performed at least in part by system 100 performing one or more steps (e.g., steps 702-712) of method 700.

Turning now to method 800 shown in FIG. 8, in step 802, a user device receives an invitation to participate in a group peer-to-peer media streaming event, such as described herein.

In step 804, the user device provides an acceptance of the invitation to a source of the invitation, such as described herein.

In step 806, the user device receives an incoming media stream as part of the group peer-to-peer media streaming event, such as described herein.

In step 808, the user device processes the incoming media stream to present a media program for experiencing by a user of the user device, such as described herein.

In step 810, the user device streams the media program from the user device to another user device as part of the group peer-to-peer media streaming event and in accordance with a peer-to-peer streaming configuration, such as described herein. Step 810 may be performed simultaneously with steps 806 and 808.

In step 812, the user device receives information about an incentive provided to the user of the user device for participation in the group peer-to-peer media streaming event, such as described herein. For example, the user device may receive information about discounted access to the media program for participation in the group peer-to-peer media streaming event.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 9:
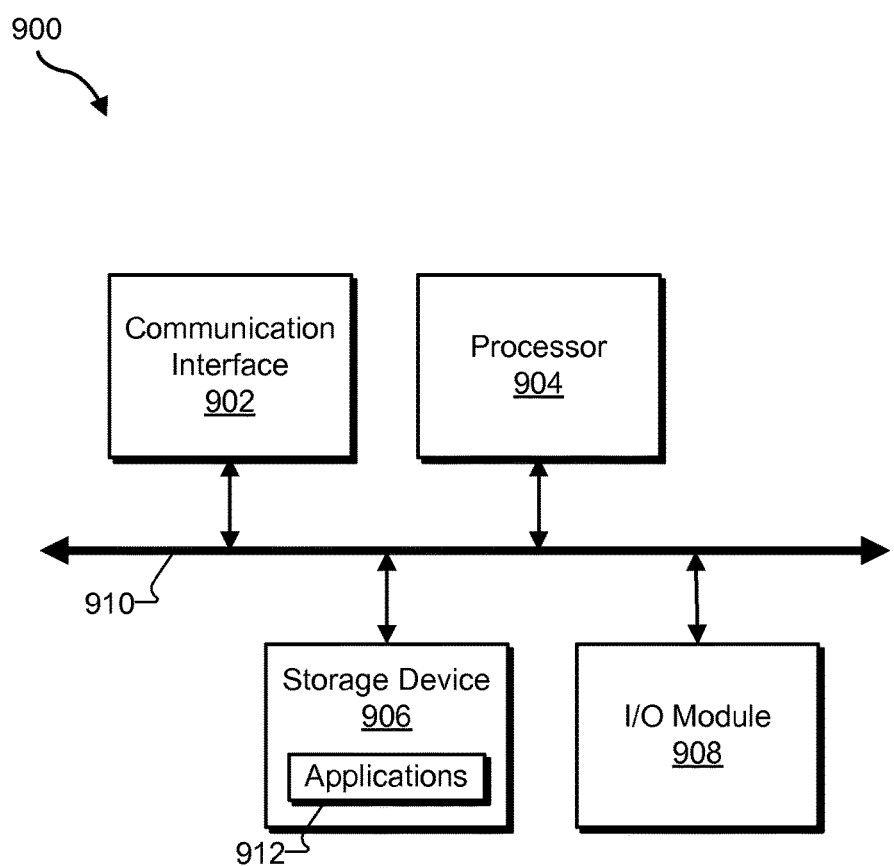
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. Communication interface 902 may additionally or alternatively provide such a connection through, for example, a local area network (such as an Ethernet network), a personal area network, a telephone or cable network, a satellite data connection, a dedicated URL, an Internet access network, or any other suitable connection. Communication interface 902 may be configured to interface with any suitable communication media, protocols, and formats.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another non-transitory computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with one or more of the facilities described herein. Likewise, one or more of the storage facilities described herein may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   scheduling, by a service providing system, a streaming of a media program to occur during a future timeslot such that the streaming of the media program is scheduled to begin at a particular date and time associated with the future timeslot;
   accessing, by the service providing system, data associated with a hosted online community comprising a plurality of members;
   defining, by the service providing system based on the accessed data associated with the online community and after the scheduling of the streaming of the media program, a group of the members of the online community, the defining comprising:
      inviting a first member and a second member of the online community to participate in the streaming of the media program scheduled to begin at the particular date and time associated with the future timeslot, the inviting comprising:
         identifying the first member of the online community to initially receive an invitation based on computing resources associated with the first member as indicated by the accessed data associated with the online community and on the first member of the online community having a particular status within the online community, wherein the particular status of the first member within the online community is based on a number of followers of the first member as indicated by the accessed data associated with the online community,
         sending, based on the identifying of the first member of the online community, the invitation to a first user device associated with the first member of the online community,
         receiving user input provided by the first member of the online community, the user input indicating one or more other members of the online community, the one or more other members of the online community including the second member of the online community, and
         sending, in response to the user input, the invitation to one or more other user devices associated with the one or more other members of the online community,
      receiving an invitation acceptance from the first member of the online community and an invitation acceptance from the second member of the online community, and
      including, based on the receiving of the invitation acceptance from the first member of the online community and the receiving of the invitation acceptance from the second member of the online community, the first member of the online community and the second member of the online community in the group of the members of the online community; and
   providing, by the service providing system, a peer-to-peer media streaming event to the defined group of the members of the online community based on the data associated with the online community, the providing of the peer-to-peer media streaming event comprising:
      determining a peer-to-peer streaming configuration for the defined group of the members based on the data associated with the online community,
      streaming, by way of the determined peer-to-peer streaming configuration and beginning at the particular date and time associated with the timeslot in accordance with the scheduled streaming of the media program, the media program from a media delivery server subsystem to the first user device associated with the first member of the online community included in the defined group of the members, and
      directing the first user device associated with the first member of the online community included in the defined group of the members of the online community to stream, by way of the determined peer-to-peer streaming configuration and while the first user device is receiving the streamed media program from the media delivery server subsystem, the media program to a second user device associated with the second member of the online community included in the defined group of the members.

2. The method of claim 1, wherein the providing of the peer-to-peer media streaming event further comprises:
   reserving, based on the invitation acceptance received from each member included in the defined group of the members of the online community, access to the streaming of the media program during the timeslot by the defined group of the members.

3. The method of claim 2, wherein the providing of the peer-to-peer media streaming event further comprises executing the streaming of the media program to the defined group of the members by way of the determined peer-to-peer streaming configuration during the timeslot.

4. The method of claim 3, wherein the determining of the peer-to-peer streaming configuration is further based on the reserved access to the streaming of the media program by the defined group of the members.

5. The method of claim 1, wherein the providing of the peer-to-peer media streaming event based on the data associated with the online community leverages one or more attributes of the online community.

6. The method of claim 5, wherein the one or more attributes of the online community comprises the computing resources associated with the first member as indicated by the accessed data associated with the online community.

7. The method of claim 1, further comprising providing, by the service providing system, discounted access to the media program to the defined group of the members for participation in the streaming of the media program;
wherein the providing of the peer-to-peer media streaming event to the defined group of the members further comprises streaming the media program to the defined group of the members during the timeslot.

8. The method of claim 7, wherein the providing of the discounted access to the media program to the defined group of the members comprises providing different discounted access to the media program to members included in the defined group of the members based on at least one of:
levels of participation of the members of the defined group in the peer-to-peer media streaming event;
statuses of one or more members of the defined group in the online community; and
relationships between one or more members of the defined group in the online community.

9. The method of claim 1, wherein the online community comprises a hosted online forum wherein the members of the online community post information about media content for shared access by the members of the online community.

10. The method of claim 1, embodied as computer-executable instructions on at least one non-transitory computer-readable medium.

11. A method comprising:
scheduling, by a service providing system, a streaming of a media program to occur during a timeslot such that the streaming of the media program is scheduled to begin at a particular date and time associated with the timeslot;
defining, by the service providing system after the scheduling of the streaming of the media program, a group of members of a hosted online community to participate in the scheduled streaming of the media program, the defining comprising:
inviting a first member of the online community and a second member of the online community to participate in the scheduled streaming of the media program, the inviting comprising:
identifying the first member of the online community to initially receive an invitation based on computing resources associated with the first member and on the first member of the online community having a particular status within the online community, wherein the particular status of the first member within the online community is based on a number of followers of the first member within the online community,
sending, based on the identifying of the first member of the online community, the invitation to a first user device associated with the first member of the online community,
receiving user input provided by the first member of the online community, the user input indicating one or more other members of the online community, the one or more other members of the online community including the second member of the online community, and
sending, in response to the user input, the invitation to one or more other user devices associated with the one or more other members of the online community;
receiving acceptances from the first member of the online community and the second member of the online community; and
including, based on the invitation acceptance received from the first member of the online community and the invitation acceptance received from the second member of the online community, the first member of the online community and the second member of the online community in the group of the members of the online community;
reserving, by the service providing system based on the received acceptances, access to the scheduled streaming of the media program by the defined group of the members;
determining, by the service providing system based on the reserved access to the scheduled streaming of the media program by the defined group of the members and online community data associated with the defined group of the members, a peer-to-peer streaming configuration for streaming of the media program to the defined group of the members during the timeslot;
streaming, by the service providing system, by way of the determined peer-to-peer streaming configuration and beginning at the particular date and time associated with the timeslot in accordance with the scheduled streaming of the media program, the media program from a host media delivery server subsystem to the first user device associated with the first member included in the defined group of the members; and
directing, by the service providing system, while the first user device is receiving the streamed media program from the host media delivery server subsystem, the first user device to stream, by way of the determined peer-to-peer streaming configuration, the media program to a second user device associated with the second member included in the defined group of the members.

12. The method of claim 11, wherein the determining of the peer-to-peer streaming configuration for streaming of the media program to the defined group of the members during the timeslot is based at least in part on one or more attributes of the online community.

13. The method of claim 12, wherein the one or more attributes of the online community comprises the computing resources associated with the first member as indicated by the accessed data associated with the online community.

14. The method of claim 11, wherein the online community comprises a hosted online forum wherein the members of the online community post information about media content for shared access by the members of the online community.

15. The method of claim 11, embodied as computer-executable instructions on at least one non-transitory computer-readable medium.

16. A method comprising:
receiving, by a first user device associated with a first member of an online community, an invitation to participate in a group peer-to-peer media streaming event in which a streaming of a media program is scheduled to begin at a particular date and time associated with a scheduled timeslot, the first member identified to initially receive the invitation based on computing resources associated with the first member as indicated by online community data and on the first member having a particular status within the online community, wherein the particular status of the first member within the online community is based on a number of followers of the first member as indicated by the online community data;
providing, by the first user device, a first acceptance of the invitation to a source of the invitation;
receiving, by the first user device, user input indicating one or more other members of the online community, the one or more other members of the online community including a second member of the online community;
receiving, by a second user device associated with the second member of the online community and based on the user input received by the first user device, the invitation to participate in the group peer-to-peer media streaming event;
providing, by the second user device, a second acceptance of the invitation to the source of the invitation;
receiving, by the first user device during the scheduled timeslot and beginning at the particular date and time associated with the scheduled timeslot in accordance with the scheduled streaming of the media program, an incoming media stream as part of the group peer-to-peer media streaming event;
processing, by the first user device, the incoming media stream to present the media program for experiencing by a user of the first user device;
while receiving and processing the incoming media stream, receiving, by the first user device, an instruction to stream the media program to the second user device as part of the group peer-to-peer media streaming event and in accordance with a peer-to-peer streaming configuration; and
while receiving and processing the incoming media stream and in response to the receiving of the instruction to stream the media program to the second user device, streaming, by the first user device, the media program to the second user device as part of the group peer-to-peer media streaming event and in accordance with the peer-to-peer streaming configuration.

17. A system comprising:
at least one physical computing device that includes a processor and that hosts an online community comprising a plurality of members;
maintains data associated with the hosted online community;
defines a group of the members of the online community by:
inviting a first member and a second member of the online community to participate in a streaming of a media program that is scheduled to occur during a future timeslot such that the streaming of the media program is scheduled to begin at a particular date and time associated with the future timeslot, the inviting comprising:
identifying the first member of the online community to initially receive an invitation based on computing resources associated with the first member as indicated by the data associated with the online community and on the first member of the online community having a particular status within the online community, wherein the particular status of the first member within the online community is based on a number of followers of the first member as indicated by the data associated with the online community,
sending, based on the identifying of the first member of the online community, the invitation to a first user device associated with the first member of the online community,
receiving user input provided by the first member of the online community, the user input indicating one or more other members of the online community, the one or more other members of the online community including the second member of the online community, and
sending, in response to the user input, the invitation to one or more other user devices associated with the one or more other members of the online community,
receiving an invitation acceptance from the first member of the online community and an invitation acceptance from the second member of the online community, and
including, based on the receiving of the invitation acceptance from the first member of the online community and the receiving of the invitation acceptance from the second member of the online community, the first member of the online community and the second member of the online community in the group of the members of the online community; and
provides a peer-to-peer media streaming event to the defined group of the members of the online community based on the data associated with the online community by:
determining a peer-to-peer streaming configuration for the defined group of the members based on the data associated with the online community,
streaming, by way of the determined peer-to-peer streaming configuration and beginning at the particular date and time associated with the timeslot in accordance with the scheduled streaming of the media program, the media program from a media delivery server subsystem to the first user device associated with the first member included in the defined group of the members, and
directing the first user device associated with the first member of the defined group of the members of the online community to stream, by way of the determined peer-to-peer streaming configuration and while the first user device is receiving the streamed media program from the media delivery server subsystem, the media program to a second user device associated with the second member included in the defined group of the members.

18. The method of claim 1, wherein:
the data associated with the hosted online community comprises data representative of computing resources associated with one or more members included in the defined group of the members, the data representative of the computing resources associated with the one or more members included in the defined group of the members including data representative of the computing resources associated with the first member; and the determining of the peer-to-peer streaming configuration is based on at least the data representative of the computing resources associated with the one or more members included in the defined group of the members.

19. The method of claim 1, wherein the inviting further comprises closing the invitation based on one or more of:
a reaching of a participant cap;
a reaching of a predetermined portion of the participant cap; and
an expiring of a predetermined time.

20. The method of claim 11, wherein:
the online community data associated with the group of the members comprises data representative of computing resources associated with one or more members included in the defined group of the members, the data representative of the computing resources associated with the one or more members included in the defined group of the members including data representative of the computing resources associated with the first member; and the determining of the peer-to-peer streaming configuration is based on at least the data representative of the computing resources associated with the one or more members included in the defined group of the members.

21. The method of claim 1, further comprising assigning, by the service providing system, a contribution score to the first member of the online community;
wherein the particular status within the online community of the first member of the online community is further based on the assigned contribution score.

22. The method of claim 21, wherein the assigning of the contribution score to the first member is based on feedback from at least one other member of the online community regarding at least one of:
a media content review submitted to the online community by the first member,
a media content recommendation submitted to the online community by the first member, and
a media content rating submitted to the online community by the first member.

23. The method of claim 1, further comprising:
allocating, by the service providing system, an overall participant cap at which a total number of participants in the peer-to-peer media streaming event is capped; and
allocating, by the service providing system, a portion of the overall participant cap as a sub-cap at which a number of participants in the peer-to-peer media streaming event who received the invitation in response to the user input provided by the first member is capped, wherein the sub-cap is determined based on the number of followers of the first member within the online community.

24. The method of claim 23, wherein the defining of the group of members of the online community comprises closing the invitation by closing an invitation sub-chain associated with the first member in response to the sub-cap being reached.

25. The method of claim 1, wherein the computing resources associated with the first member as indicated by the accessed data associated with the online community comprise processor resources, media encoding and decoding resources, and data buffering resources.

26. The method of claim 1, wherein the invitation notifies that the streaming of the media program is scheduled to begin at the particular date and time associated with the future timeslot.

* * * * *